(12) United States Patent
Kerner et al.

(10) Patent No.: US 7,484,584 B1
(45) Date of Patent: Feb. 3, 2009

(54) HEAT EXCHANGER SYSTEM

(75) Inventors: Rick Kerner, Roseau, MN (US); Norman O. Berg, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 11/941,613

(22) Filed: Nov. 16, 2007

Related U.S. Application Data

(63) Continuation of application No. 11/474,891, filed on Jun. 23, 2006, now Pat. No. 7,296,645, which is a continuation of application No. 10/699,592, filed on Oct. 31, 2003, now Pat. No. 7,080,704.

(51) Int. Cl.
  *B60K 1/00* (2006.01)
(52) U.S. Cl. ..................................... 180/68.1; 180/68.4
(58) Field of Classification Search ................. 180/190, 180/68.1, 9.25, 68.2, 69.2, 69.24, 68.4
See application file for complete search history.

(56) References Cited

U.S. PATENT DOCUMENTS

| | | | |
|---|---|---|---|
| 3,205,964 A | 9/1965 | Henry-Biabaud | |
| 3,970,164 A | 7/1976 | Suzuki | |
| 4,249,626 A | 2/1981 | Fields et al. | |
| 4,445,587 A | 5/1984 | Hillman | |
| 4,457,558 A * | 7/1984 | Ishikawa ................. | 296/180.5 |
| 4,564,081 A | 1/1986 | Hamane et al. | |
| 4,570,740 A | 2/1986 | Hara | |
| 4,604,974 A | 8/1986 | Watanabe | |
| 4,667,758 A | 5/1987 | Tamura | |
| 4,706,615 A | 11/1987 | Scadding | |
| 4,709,774 A | 12/1987 | Saito et al. | |
| 4,995,447 A | 2/1991 | Weidmann et al. | |
| 5,129,473 A | 7/1992 | Boyer | |
| 5,152,365 A | 10/1992 | Aoshima | |
| 5,174,258 A | 12/1992 | Tanaka | |
| 5,251,718 A * | 10/1993 | Inagawa et al. ............. | 180/190 |
| 5,476,138 A | 12/1995 | Iwasaki et al. | |
| 5,660,245 A | 8/1997 | Marier et al. | |
| 6,019,161 A | 2/2000 | Travis | |
| 6,105,701 A | 8/2000 | Buell | |
| 6,109,217 A | 8/2000 | Hedlund et al. | |
| 6,439,328 B1 | 8/2002 | Vaillancourt et al. | |
| 6,561,297 B2 | 5/2003 | Yatagai et al. | |
| 6,644,261 B2 | 11/2003 | Morii et al. | |
| 6,880,659 B2 | 4/2005 | Yamamoto | |
| 7,036,619 B2 | 5/2006 | Yatagai et al. | |
| 7,040,437 B1 * | 5/2006 | Fredrickson et al. ........ | 180/190 |
| 7,080,704 B1 | 7/2006 | Kerner et al. | |
| 7,104,355 B2 | 9/2006 | Hoi | |

\* cited by examiner

*Primary Examiner*—Christopher P Ellis
*Assistant Examiner*—Brian Swenson
(74) *Attorney, Agent, or Firm*—Baker & Daniels LLP

(57) ABSTRACT

The invention provides an apparatus and method for providing a heat exchanger for vehicles that have liquid cooled engines. The heat exchanger is positioned within the vehicle so as to accept airflow moving across the vehicle when the vehicle is in motion. The heat exchanger is positioned within the vehicle so as not to adversely affect the vehicle's center of gravity. A divider is used with the heat exchanger to help channel at least a portion of the airflow to the heat exchanger, while also preventing any byproduct produced from contact between airborne materials and the heat exchanger from causing a nuisance to the operator.

20 Claims, 5 Drawing Sheets

HEAT EXCHANGER SYSTEM

CROSS-REFERENCE TO RELATED APPLICATION

This application is a continuation of U.S. patent application Ser. No. 11/474,891, filed Jun. 23, 2006 now U.S. Pat. No. 7,296,645 which is a continuation of U.S. patent application Ser. No. 10/699,592, filed Oct. 31, 2003, now U.S. Pat. No. 7,080,704, the disclosures of which are expressly incorporated by reference herein.

TECHNICAL FIELD

The invention relates to improved cooling systems for vehicles. In particular, the invention relates to improved heat exchanger systems for vehicles having liquid-cooled engines.

BACKGROUND OF THE INVENTION

It is well known that many vehicles, including motorcycles, snowmobiles, all-terrain vehicles, watercraft, and the like, are powered by internal combustion engines. Typically, these engines are positioned within engine compartments and are adapted to propel the vehicles. Generally, each internal combustion engine communicates with a cooling system that functions to cool the engine. If the engine is liquid cooled, the cooling system generally will include one or more heat exchangers (e.g., extruded radiators). These heat exchangers are typically spaced away from the engine and are used for running engine coolant therethrough for heat dissipation purposes, as is known in the art. Generally, these heat exchangers are linked to the engine through passages (e.g., rubber hoses) operatively coupled to the engine.

In snowmobiles, the heat exchangers are generally positioned within the snowmobile drive tunnel (generally located beneath a rear body portion of the snowmobile). An endless drive track, also disposed within the drive tunnel, carries and circulates snow within the drive tunnel as the track moves. The heat exchangers are positioned adjacent to the track so that some of the snow carried by the track is subsequently deposited onto the heat exchangers. Generally, the coolant running from the engine is of an elevated temperature. As such, when circulated through the heat exchanger, the coolant causes outer surfaces of the heat exchanger to rise in temperature. Subsequently, if cool air makes contact with the heat exchanger, the air will likely cause the heat exchanger outer surfaces to lower in temperature, thereby also lowering the temperature of the engine coolant circulating therein as well. Alternatively, if snow makes contact with the heat exchanger, it will likely melt because of the high temperature outer surfaces of the heat exchanger. The melting of the snow requires a substantial amount of heat, which is essentially removed from the heat exchanger and the engine coolant therein.

Engine cooling problems can occur with snowmobiles, however, when used in low snow or tightly-packed snow conditions (e.g., on a road), from which little or no snow is kicked up onto the heat exchangers in the tunnel. Thus, in many snowmobile designs, the heat exchangers within the snowmobile drive tunnel are used in combination with one or more additional heat exchangers positioned in a front portion of the snowmobile, generally within a body assembly. These heat exchangers, typically located forward of the tunnel and within the body assembly, communicate with one or more openings in the body assembly (i.e., in the hood). In turn, these heat exchangers provide heat exchange between the engine coolant circulated therein and air or airborne precipitation (e.g., snow, water, etc.) that enters the snowmobile through the openings. In turn, the engine may be adequately cooled using these heat exchangers in combination.

Unfortunately, problems are known to exist in using heat exchangers in the body assembly as described above. One such problem is the heat exchanger's potential of providing the snowmobile with a higher center of mass. As mentioned above, the heat exchanger is generally located proximate to one or more openings in the body assembly. By locating the heat exchanger proximate to the openings, the heat exchanger, in turn, is positioned relatively high in the body assembly. In turn, the snowmobile's center of mass is raised, which can likely affect the overall stability of the snowmobile. Consequently, when ridden, the snowmobile may be limited, for example, in its handling or maneuverability, which could lead to consumers having a negative impression of the snowmobile.

Another problem with such a system is the heat exchanger's potential to create steam. As mentioned above, these heat exchangers are located within the body assembly, proximate to the openings in the body assembly. As airborne precipitation (snow, water, etc.) enters the openings, it comes in contact with the heat exchanger. Contact between the high temperature outer surface of the heat exchanger and the lower temperature precipitation generally leads to the precipitation vaporizing into steam. Such steam subsequently rises out of the body assembly through the openings in the hood. As soon as the steam exits the hood, it generally condenses due to the cold outside air temperature. Subsequently, the condensation is directed at the windshield of the snowmobile by the natural flow of the air into and about the outer surface of the snowmobile. Likewise, such condensation is directed at the operator of the snowmobile. If exposed to freezing air temperatures, the condensation may additionally freeze. This condensation, being directed at and potentially freezing to the windshield and the operator, can be a nuisance for the operator in operating the snowmobile.

SUMMARY OF THE INVENTION

Certain embodiments of the invention provide a snowmobile having a longitudinally extending chassis having a front portion and a rear portion. The chassis supports a liquid-cooled engine proximate the front portion and an operator seat proximate the rear portion. The engine includes coolant passages for carrying liquid coolant that absorbs heat generated by the engine during operation. The engine powers a drive track operatively connected to the chassis proximate the rear portion. The chassis front portion mounts a pair of steerable skis and supports a body assembly containing the engine and a heat exchanger. The heat exchanger is housed within the body assembly, connected in fluid communication with the engine coolant passages, and adapted to dissipate heat from the liquid coolant. The body assembly has airflow inlet openings and outlet apertures for allowing ambient air into and out of the body assembly and in contact with the heat exchanger. The body assembly is formed by an upwardly open nosepan covered by a hood.

In certain embodiments of the snowmobile of the invention, the heat exchanger is contained within the nosepan. Additionally, in certain embodiments of the snowmobile of the invention, the heat exchanger is located forward of the engine. Also, in certain embodiments of the snowmobile of the invention, the heat exchanger and the engine each define a center of mass, with the heat exchanger center of mass below the engine center of mass. Additionally, in certain embodiments of the snowmobile of the invention, the airflow outlet aperture is in the nosepan, whereby air flowing out the outlet aperture during forward movement of the snowmobile is not directed upwardly rearward towards the operator. Also, in certain embodiments of the snowmobile of the invention, the airflow inlet opening is in the nosepan.

Further, certain embodiments of the invention provide a snowmobile having a longitudinally extending chassis having a front portion and a rear portion. The chassis supports a liquid-cooled engine proximate the front portion and an operator seat proximate the rear portion. The engine includes coolant passages for carrying liquid coolant that absorbs heat generated by the engine during operation. The engine powers a drive track operatively connected to the chassis proximate the rear portion. The chassis front portion mounts a pair of steerable skis and supports a body assembly containing the engine and a heat exchanger. The heat exchanger is housed within the body assembly, connected in fluid communication with the engine coolant passages, and adapted to dissipate heat from the liquid coolant. The body assembly has airflow inlet openings and outlet apertures for allowing ambient air into and out of the body assembly. One or more of the airflow inlet openings is in contact with the heat exchanger. The body assembly includes a first airflow inlet opening allowing ambient air into a first cavity within the body assembly. The first cavity contains the heat exchanger. The ambient air entering the first cavity through the first airflow inlet opening does not contact the engine.

Finally, certain embodiments of the invention provide a recreational or utility vehicle having a longitudinally extending chassis having a front portion and a rear portion. The chassis supports a liquid-cooled engine. The engine includes coolant passages for carrying liquid coolant that absorbs heat generated by the engine during operation. The chassis supports a body assembly containing the engine and a heat exchanger. The heat exchanger is housed within the body assembly, connected in fluid communication with the engine coolant passages, and adapted to dissipate heat from the liquid coolant. The body assembly includes first and second airflow inlet openings that are exposed to airflow when the vehicle is in motion. The first airflow inlet opening allows ambient air into a first cavity within the body assembly. The first cavity contains the heat exchanger. The ambient air entering the first cavity through the first airflow inlet opening does not contact the engine. The first cavity is separated from a second cavity within the body assembly. The second cavity contains the engine. Ambient air entering the second cavity does not contact the heat exchanger. The second airflow inlet opening allows ambient air into one of the first and second cavities.

The above mentioned and other features of this invention, and the manner of attaining them, will become more apparent and the invention itself will be better understood by reference to the following description of embodiments of the invention taken in conjunction with the accompanying drawings.

DETAILED DESCRIPTION OF EMBODIMENTS OF THE INVENTION

Figure 1:
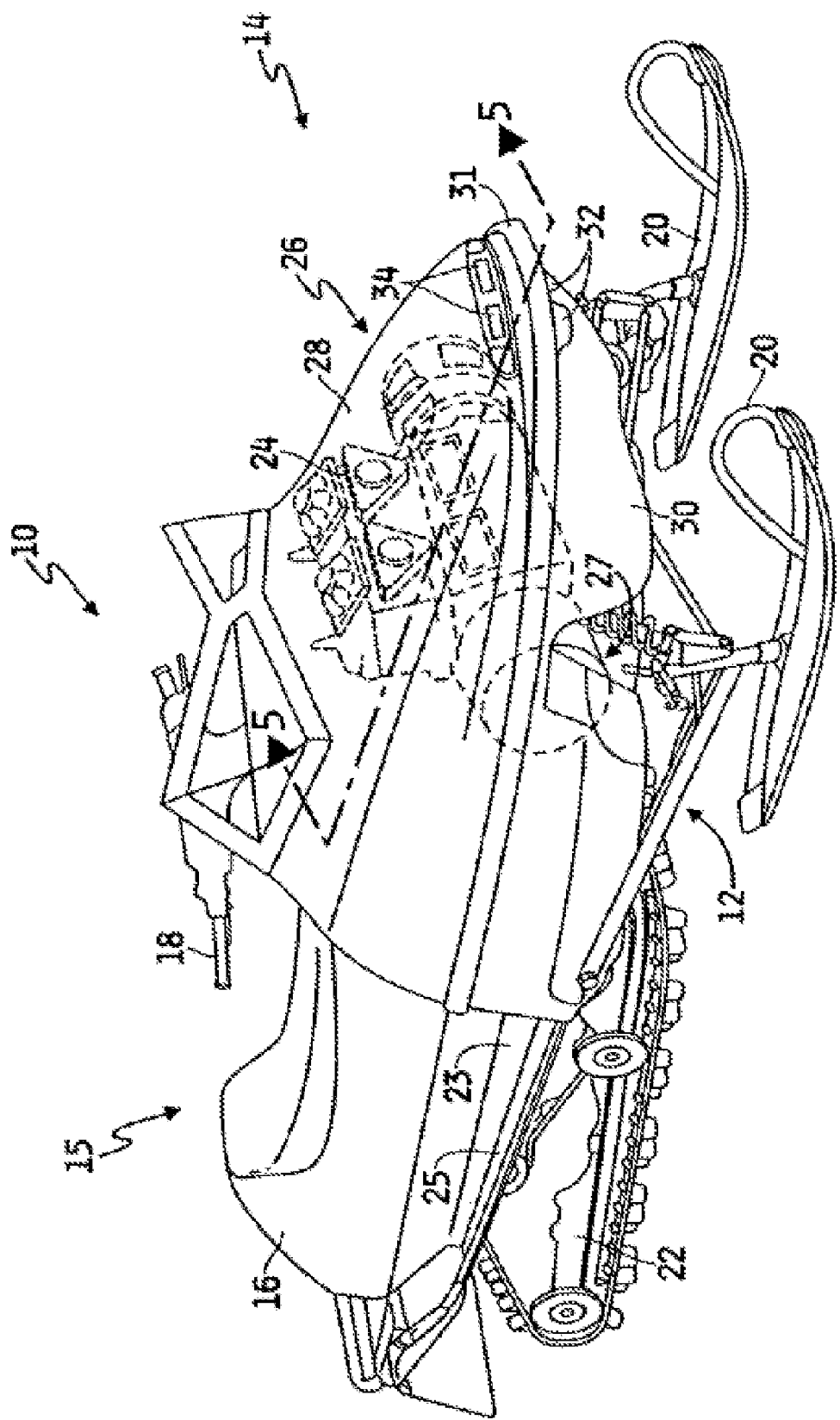
FIG. 1 is a schematic perspective view showing front and side surfaces of a snowmobile in accordance with certain embodiments of the invention.

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the vehicle incorporating the system illustrated in the drawings could be changed or modified by one of ordinary skill in the art without departing significantly from the spirit of the invention. The heat exchanger system of the invention is exemplified for use on vehicles such as snowmobiles; however, the system may also be used on other vehicles having liquid-cooled engines, such as motorcycles, all-terrain vehicles, watercraft, and the like.

A snowmobile 10 having a system in accordance with one embodiment of the invention is illustrated in FIG. 1. The snowmobile 10 includes a number of parts formed of suitable materials that cover, protect, and are supported by a longitudinally extending chassis 12. The chassis has a front portion 14 and a rear portion 15. Proximate to the rear portion 15, the chassis supports a drive tunnel that accommodates a seat 16 adapted to carry one or more riders in straddle fashion. A handlebar assembly 18, positioned forwardly of the seat 16, is conventionally connected to a pair of front skis 20 for steering the snowmobile 10. The front skis 20 are supported by a suitable front suspension system that is connected to the chassis 12, proximate to the front portion 14. Beneath the seat 16 and within the drive tunnel, a suitable rear suspension is operatively coupled to the drive tunnel (or alternatively, to the chassis 12) and suspends an endless track assembly 22. The endless track assembly 22 is driven by an internal combustion engine 24 (represented in dashed lines), which is located within a body assembly 26 and supported by the front portion 14 of the chassis 12. In preferred embodiments, a heat exchanger (not visible in FIG. 1) is also located within the body assembly 26.

The tunnel has a top portion (not visible in FIG. 1) under the seat 16 which connects to generally downwardly extending sidewalls 23 (only one of which is visible in FIG. 1) that are positioned on opposite sides of the endless track 22. As such, the endless track 22 is disposed within the drive tunnel. Generally horizontal running boards 25 (only one of which is visible in FIG. 1) extend outward from the chassis 12 or extend outward from each sidewall 23 respectively. The width of the running boards 25 preferably tapers rearwardly. The engine 24 is liquid-cooled and includes passages (not shown) for carrying liquid coolant that absorbs heat generated by the engine 24 during operation. Although not expressly shown, the engine 24 contains a conventional pump for circulating the liquid coolant from the engine 24 through the heat exchanger and back to the engine 24. The front skis 20 exit the body assembly 26 through suspension wells 27 (only one of which is visible in FIG. 1) defined therein.

Figure 2:
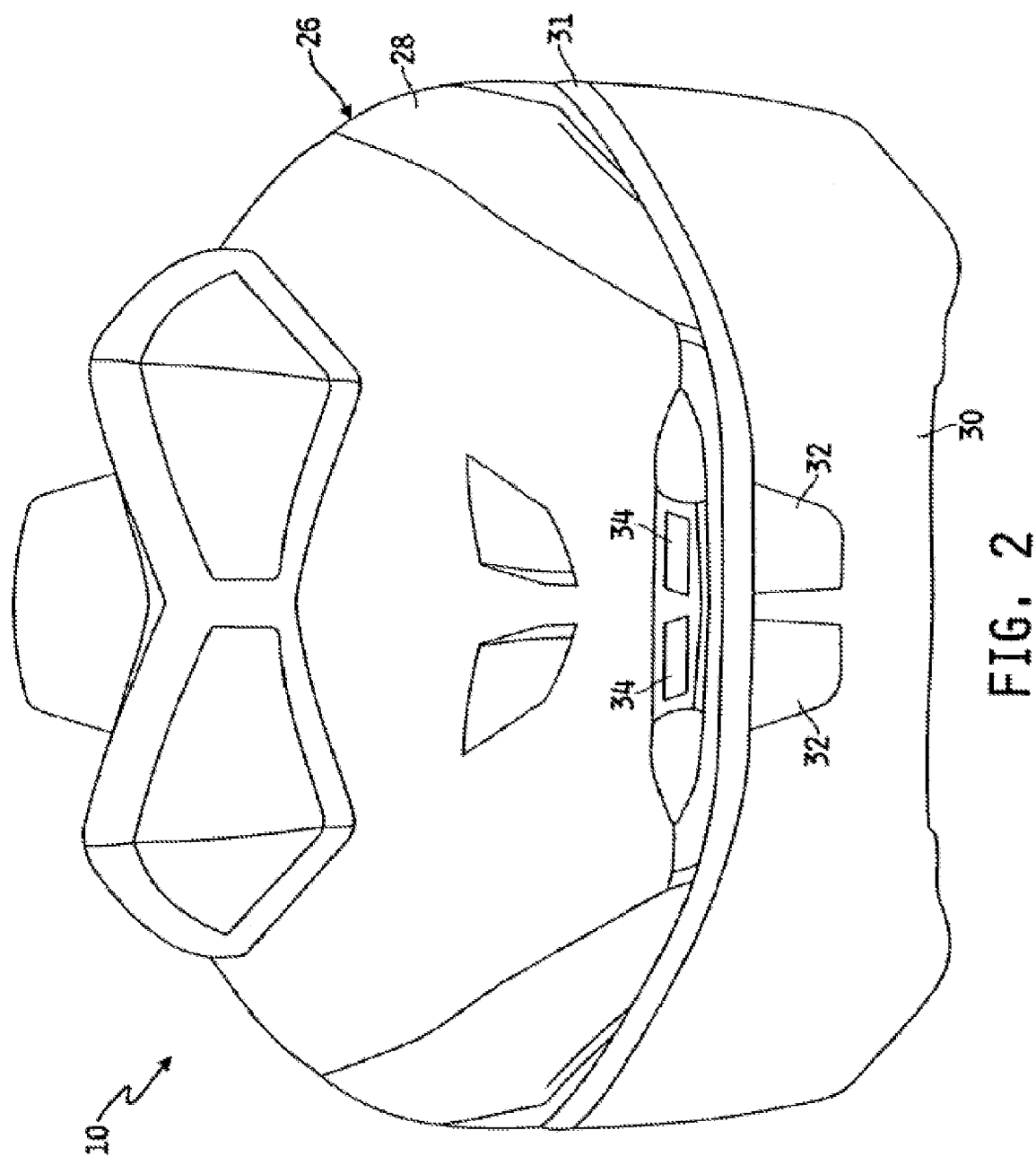
FIG. 2 is a schematic elevation view showing the front surface of the snowmobile of FIG. 1.

A front face of the snowmobile 10 is shown in FIG. 2. The snowmobile 10 is illustrated without the front skis 20 shown in FIG. 1. As shown in FIGS. 1 and 2, the body assembly 26 includes a hood 28 defining a frontal upper portion of the snowmobile 10 and an upwardly opening nose pan 30 defining a frontal lower portion of the snowmobile 10 covered or closed by the hood 28. The hood 28 and nose pan 30 are preferably separated by a belt line 29 (not visible in FIGS. 1 and 2, but visible in FIGS. 3, 5, and 6), generally covered by a bumper 31 (also shown in FIG. 1) of the snowmobile 10. The hood 28 and nose pan 30 each include a plurality of holes or apertures. Preferably, the plurality of holes includes one or more first airflow inlet openings 32 (preferably in the nose pan 30) and one or more second airflow inlet openings 34 (preferably in the hood 28). One or more of these openings 32, 34 preferably communicates fluidly with the heat exchanger (not visible in FIG. 2) located within the body assembly 26. In preferred embodiments, as shown, the first openings 32 are generally centrally located on a front surface of the nose pan 30, forward-oriented, and generally square-shaped. In preferred embodiments, the second openings 34 are generally centrally located on a lower front surface of the hood 28, forward-oriented, and generally rectangular-shaped. Preferably, both openings 32, 34 are oriented forward of the operator of the snowmobile 10 and allow for ambient air to flow therethrough.

Figure 3:
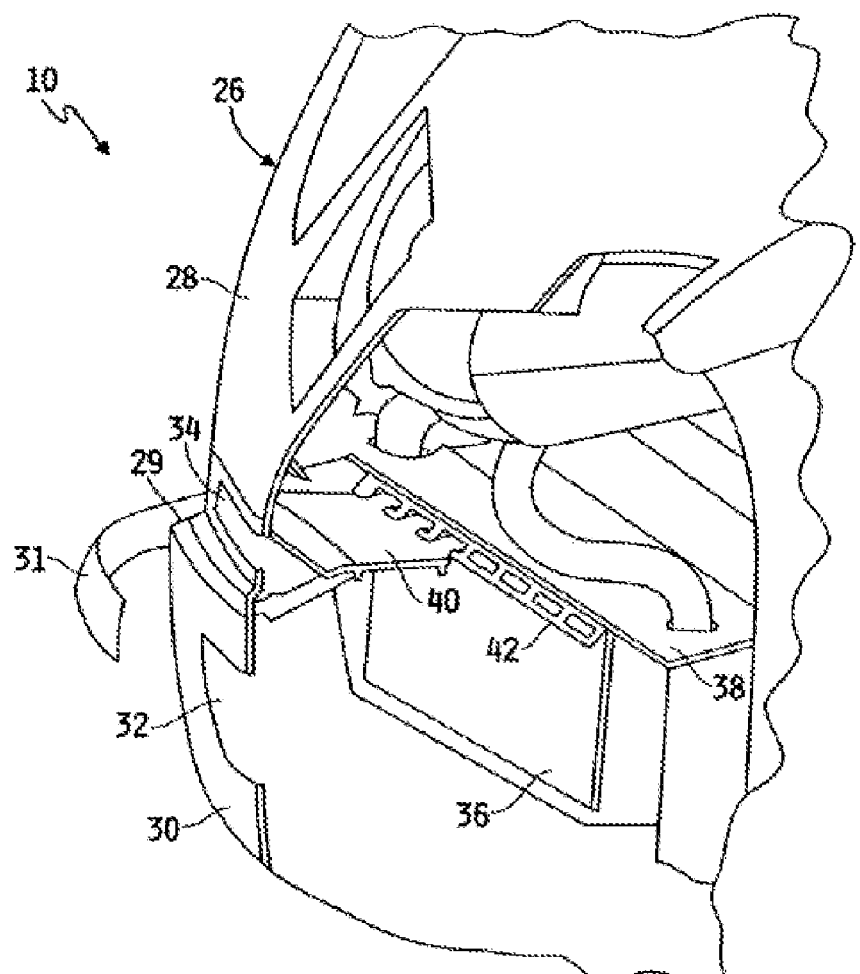
FIG. 3 is a schematic cutaway perspective view of a portion of the front surface of the snowmobile of FIG. 1.

A perspective view showing a cutaway front portion of the snowmobile hood 28 is illustrated in FIG. 3. As such, the heat exchanger 36, normally housed underneath the hood 28 of the snowmobile 10, is visible. In preferred embodiments, as shown, the heat exchanger 36 is an auxiliary radiator. A framework 38 that generally defines an upper surface of the nose pan 30 preferably secures the heat exchanger 36. In turn, the heat exchanger 36 is positioned within the confines of the nose pan 30, and is preferably positioned lower than the beltline 29 of the snowmobile 10. Consequently, the heat exchanger 36 is positioned low in the body assembly 26 so as not to raise the center of mass of the snowmobile 10 with the inclusion of the heat exchanger 36. In preferred embodiments, the heat exchanger 36 is positioned proximate to the first and second openings 32, 34 in the nose pan 30 and hood 28, respectively. As such, air that flows into the openings 32, 34 may naturally flow to the heat exchanger 36 as described below.

In preferred embodiments, a divider 40 is included within the body assembly 26. Preferably, the divider 40 is a generally rectangular plate and is operatively coupled to the framework 38. In the embodiment shown in FIG. 3, the divider 40 is coupled to the framework 38 via a hinge 42 formed by a forward end of the framework 38 and a rear end of the divider 40. As such, the divider 40 is positioned above the heat exchanger 36. In combination, a lower surface of the divider 40 and hinge 42 define an upper extension for the heat exchanger 36, while an upper surface of the nose pan 30 defines a lower extension for the heat exchanger 36. As such, both extensions generally define a first cavity 43 through which air may flow from one or more of the openings 32, 34 to the heat exchanger 36. Preferably, the divider 40 is disposed so as to extend laterally across the length of the heat exchanger 36; however, FIG. 3 shows only a portion of the divider length so as to not conceal the heat exchanger 36.

The hinge 42 allows the divider 40 to be pivoted higher and lower about a generally horizontal axis defined by the hinge 42. Adjusting the divider 40 about the hinged point in this fashion can modify the volume of the first cavity 43 by widening or narrowing a front opening of the first cavity 43. In turn, the volume of air that the first cavity 43 accommodates can be modified. Consequently, the amount of air that can travel into the first cavity 43 at a given time is also made modifiable, as described below. Thus, the adjustability of the divider 40 provides variability in regard to the cooling functionality of the heat exchanger 36.

Figure 4:
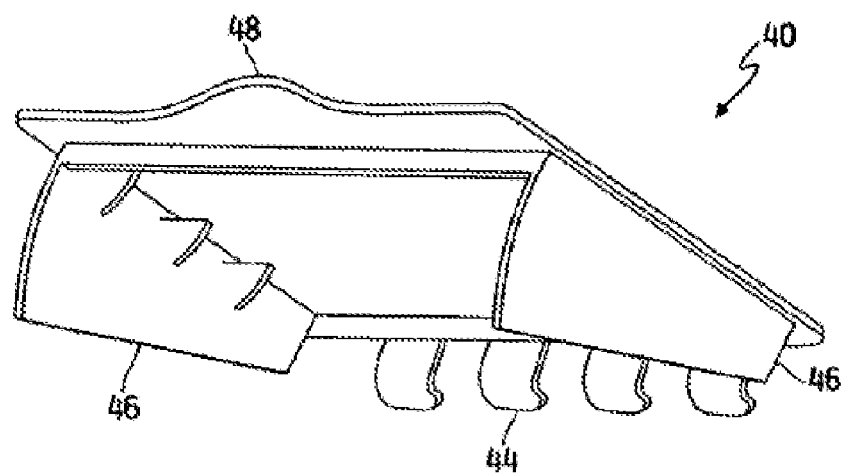
FIG. 4 is a schematic perspective view showing front and side surfaces of a divider in accordance with certain embodiments of the invention.

A perspective view of one embodiment of the divider 40 is shown in FIG. 4. In preferred embodiments, the divider 40 is fabricated of a plastic or like resilient material and is, in turn, formed by injection molding. As described above, the divider 40 preferably has male hinge portions 44 located on one end to enable the divider 40 to be coupled to the framework 38 (shown in FIG. 3). In turn, an opposing end of the divider 40 can be raised or lowered about the hinged point. Preferably, as shown, side segments 46 extend downward from each side of the divider 40. The segments 46 function in further directing air flowing through one or more of the openings 32, 34 to the heat exchanger 36. Finally, the front end of the divider 40 preferably includes a protrusion 48 to function in securing the divider 40 in its intended position.

Figure 5:
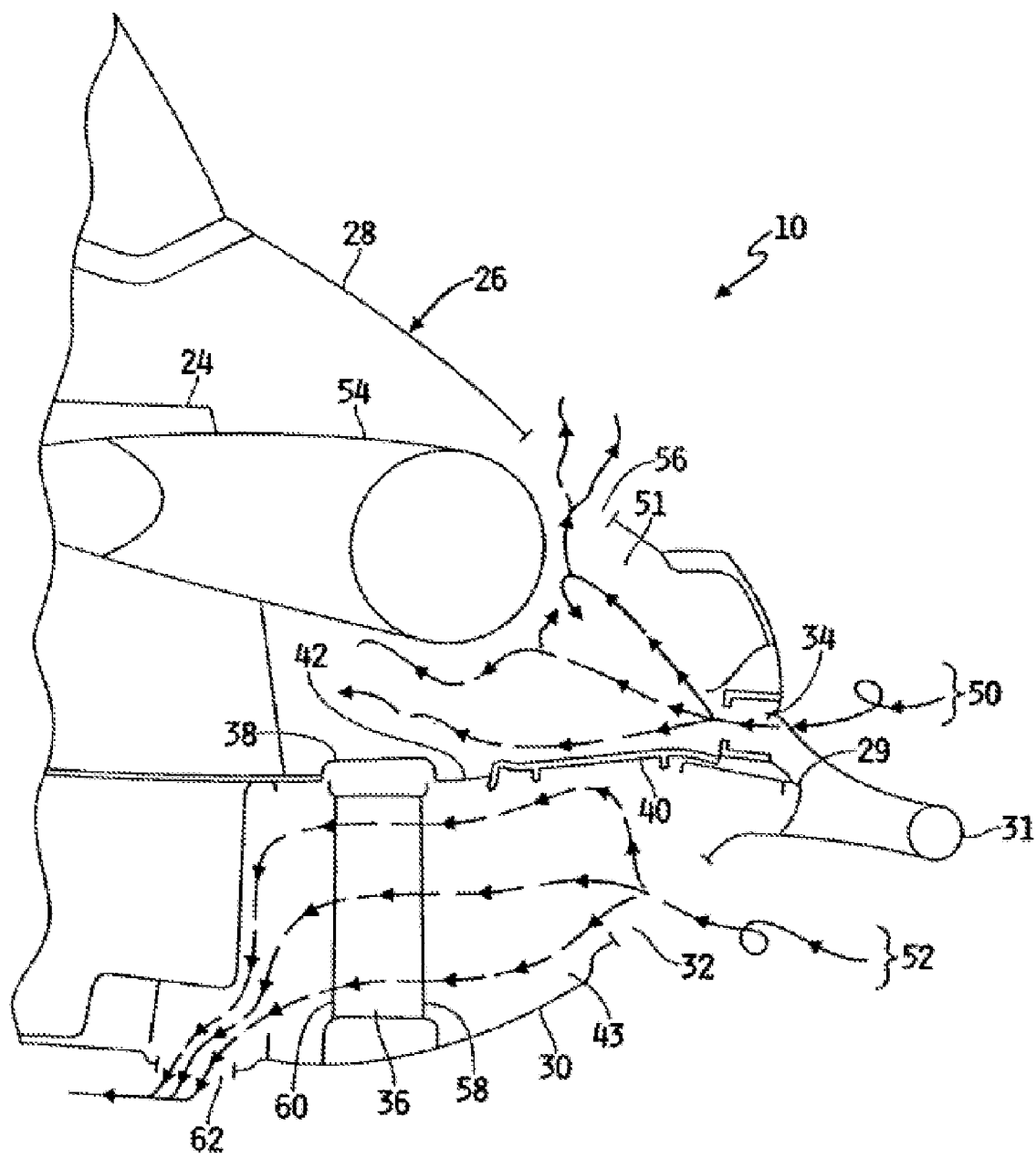
FIG. 5 is a schematic cross-sectional side view of a front portion of the snowmobile of FIG. 1 taken about the lines V-V in accordance with certain embodiments of the invention.

A cross-sectional side view of a front portion of the snowmobile 10 taken about lines 5-5 of FIG. 1 is illustrated in FIG. 5 in accordance with certain embodiments. In such certain embodiments, as depicted, the heat exchanger 36 is contained within the nosepan 30, and perhaps more preferably, the heat exchanger 36 is completely contained within the nosepan 30. The heat exchanger 36 has an established center of mass, as does the engine 24. Determining the center of mass for such objects is well known in the art. In certain embodiments, when the heat exchanger 36 and the engine are installed on the snowmobile 10, as depicted in FIG. 5, the center of mass of the heat exchanger 36 is below the center of mass of the engine 24, and perhaps more preferably, the center of mass of the heat exchanger 36 is at least one inch below the center of mass of the engine 24. In other certain embodiments, the center of mass of the heat exchanger 36 is below the belt line 29 of the snowmobile 10. As shown in FIG. 5, in certain embodiments, the heat exchanger 36 is located forward of the rear of the engine 24, and perhaps preferably, the heat exchanger 36 is located forward of the engine 24. Generally, the engine 24 has an exhaust pipe system including an exhaust headpipe 54. In certain embodiments, the heat exchanger 36 is located below the exhaust headpipe 54, perhaps more preferably below an elbow in the exhaust headpipe 54, and perhaps optimally, under the elbow in the exhaust headpipe 54.

As shown in FIG. 5, the divider 40 is rotatably coupled at hinge 42 to framework 38. The divider is rotated about its hinge 42 to a first position. In the first position, the divider 40 is positioned so as to be in a generally horizontal orientation. As such, the forward end of the divider 40 preferably extends higher than first openings 32 and lower than second openings 34. In preferred embodiments, the front end of the divider 40 is secured in this first position at an upper portion of the nose pan 30. This securement can be provided any of a number of ways, as is known in the art. One type of securing method is to have the protrusion 48 (FIG. 4) on the front end of the divider 40 held between two rigid segments extending from the underside of the body assembly 26.

In the first position, the divider 40 preferably directs external air 50, 52 entering the body assembly 26 from both the first openings 32 and the second openings 34. In preferred embodiments, as shown, with the divider 40 in the first position, ambient air 52 entering from the first openings 32 is directed under the divider 40 into the first cavity 43 towards the heat exchanger 36. The ambient air 50 entering from the second openings 34 is directed over the divider 40 into an second cavity 51 towards the engine 24 and exhaust headpipe 54. The air 50 routed to the second cavity 51, and to the engine 24 and exhaust headpipe 54, provides for direct cooling of the engine 24, while the air 52 routed to the first cavity 43, and to the heat exchanger 36, provides for indirect cooling of the engine 24 (i.e., by way of cooling the engine coolant circulating within the heat exchanger 36).

As shown in FIG. 5, the air 50 directed into the second cavity 51 (i.e., above the divider 40) either remains within the second cavity 51 or is directed out one or more upper holes 56 defined in the hood 28. In contrast, the air 52 directed into the first cavity 43 (i.e., below the divider 40) preferably enters a front surface 58 of the heat exchanger 36 and exits a rear surface 60. With the heat exchanger 36 positioned low in the body assembly 26, once the air 52 exits the rear surface 60 of the heat exchanger 36, the air 52 is preferably directed through an outlet aperture 62.

In preferred embodiments, the outlet aperture 62 is defined in the nose pan 30, located rearward of the heat exchanger 36, and below the center of mass of the engine 24. Preferably, the outlet aperture 62 is respectively defined in one or more of the suspension wells 27 of the snowmobile 10 (shown in FIG. 1). As detailed above, the front skis 20 exit the body assembly 26 through the suspension wells 27 defined therein. Such wells 27 typically are sealed to prevent snow from entering the body assembly 26. In certain embodiments, one or more of the suspension wells 27 defines the outlet aperture 62 therein. The outlet aperture 62 can be a variety of sizes, however, it is preferably sized to be at least one square inch, and perhaps optimally, at least six square inches.

Typically, the air 52 entering the first cavity 43 flows naturally from the heat exchanger 36 and continues through the outlet aperture 62 due to the negative pressure that is exhibited underneath the nose pan 30 when the snowmobile 10 is in motion. Because of the negative pressure created when the snowmobile 10 is in motion, the air 52 is pulled through the heat exchanger 36, through the outlet aperture 62, rearward around the track assembly 22, and under the running boards 27. Consequently, the air 52 is not directed upwardly rearward towards the operator of the snowmobile 10.

Figure 6:
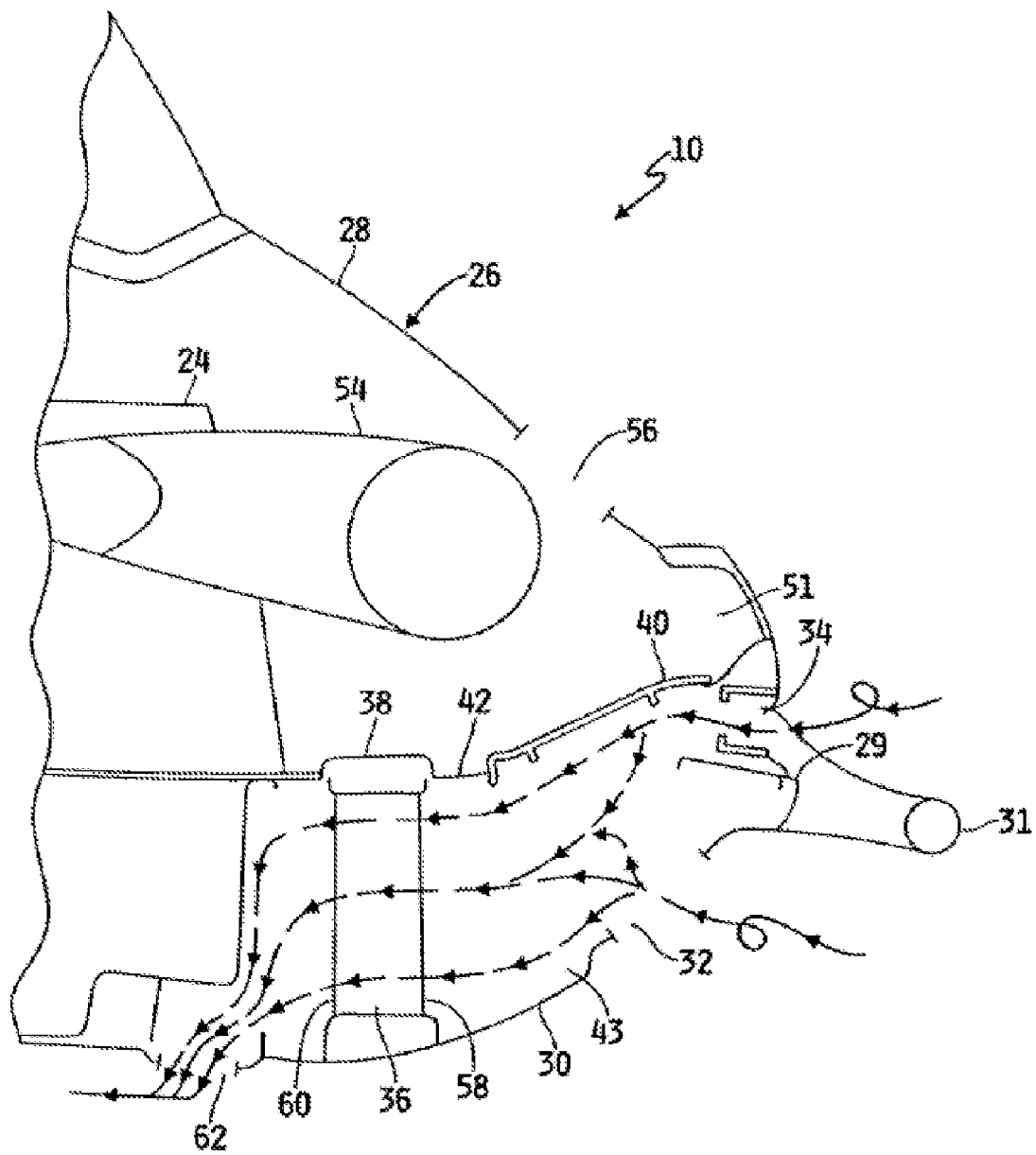
FIG. 6 is a schematic cross-sectional side view of a front portion of the snowmobile of FIG. 1 taken about the lines V-V in accordance with other certain embodiments of the invention.

FIG. 6 shows the cross-sectional view of FIG. 5, except the divider 40 is shown rotated to a second position. In this second position, the divider 40 is rotatably coupled at hinge 42 to the framework 38, yet positioned in an upwardly angled orientation with respect to the hinge portion 42. As such, the front end 49 of the divider 40 preferably extends higher than the first and second openings 32, 34, and is secured to a lower portion of the hood 28. As described above, such securement can be made in a variety of ways as is known in the art. In the second position, the divider 40 preferably directs external air entering the body assembly 26 from both the first and second openings 32, 34 into the first cavity 43 towards the heat exchanger 36. Consequently, as described above, the air routed into the first cavity 43 provides for indirect cooling of the engine 24 (i.e., by way of cooling the engine coolant circulating within the heat exchanger 36). Additionally, as described above in relation to FIG. 5, the air flowing to the heat exchanger 36 preferably flows through the heat exchanger 36 via the front surface 58 and exits the rear surface 60. As such, once the air exits the rear surface 60 of the heat exchanger 36, the air is preferably directed through the outlet aperture 62 preferably defined in the nose pan 30 as described above.

As shown in FIGS. 5 and 6 and described above, the air that is directed into the first cavity 43 through one or more of the openings 32, 34 subsequently flows through the heat exchanger 36 and exits through the outlet aperture 62. However, additional materials may be airborne that enter the openings 32, 34 as well. For example, in the case of snowmobiles, precipitation (snow, water, etc) may enter the openings 32, 34. As mentioned above, if snow were to contact a high temperature surface of the heat exchanger 36, the snow would generally vaporize. In turn, the water vapor would likely travel out hood openings 56 to likely condense, and subsequently be directed at the windshield of the snowmobile 10 as well as the operator. However, in using the divider 40 (and the hinged portion 42 of the framework 38) to form the upper extension for the first cavity 43 extending to the heat exchanger 36, such water vapor can generally be kept within the first cavity 43. In turn, the chances of the precipitation leaving the body assembly 26 through the hood 28 are greatly reduced. Consequently, the operator is less likely to be affected, as detailed above.

Whether the divider 40 is in the first or second position, generally the same amount of air generally is brought into the body assembly 26 (i.e., via the first and second openings 32, 34). As shown in FIG. 5, with the divider 40 in the first position, the incoming air 50 is routed into the second cavity 51 (to the engine 24 and exhaust pipe 54) and the incoming air 52 is routed into the first cavity 43 (to the heat exchanger 36). As shown in FIG. 6, with the divider 40 in the second position, the incoming air is only routed into the first cavity 43 (to the heat exchanger 36). While both positions provide cooling, it is believed that having the divider 40 in the second position provides an increased cooling function in comparison with having the divider 40 in the first position. This is largely because when the divider 40 is in the first position, at least a portion of the air 50 directed to the engine 24 and exhaust pipe 54 is routed out one or more of the openings 56 in the hood 28. As such, it is believed that the air 50 provides less of a cooling effect on the engine 24. In contrast, when the divider 40 is in the second position, there is no such opening for the air directed to the heat exchanger 36 to escape through. Consequently, the vast majority of the air directed at the heat exchanger 36 in turn flows through the heat exchanger 36, which enables the second position of the divider 40 to be more efficient in terms of overall engine cooling than the first position.

As described above and shown in FIGS. 5 and 6, when one adjusts the divider 40 from the first position to the second position, the volume of the first cavity 43 is increased. In addition, ambient air can be directed into the first cavity 43 via both of the openings 32, 34. In turn, an increased amount of ambient air can be directed into the first cavity 43 (and into the heat exchanger 36) per unit time. Consequently, with the increased ambient air amount per unit time through the heat exchanger 36, there is increased cooling of the engine 24 via the heat exchanger 36. Consequently, the increased cooling from the heat exchanger 36 can compensate for a lack of cooling of the engine 24 from heat exchangers located in the drive tunnel during poor cooling conditions (i.e., low snow or tightly-packed snow conditions). However, while the overall cooling of the snowmobile 10 may be increased by positioning the divider 40 in the second position, the increased airflow amount directed through the heat exchanger 36 also may cause the snowmobile 10 to be less aerodynamic. In effect, the overall top-end speed that the snowmobile 10 normally reaches may be decreased along with its fuel efficiency because of the change in divider position.

As mentioned above, whether the divider 40 is in the first or second position, the same amount of air is being brought into the engine compartment 26 (i.e., via the first and second openings 32, 34). However, when the divider 40 is in the first position, much of the air 50 that is routed into the second cavity 51 is in turn funneled out one or more of the openings 56 in the hood 28 without much of a drag effect on the snowmobile 10. In contrast, when the divider 40 is in the second position, the air directed into the first cavity 43 generally has to flow through the heat exchanger 36 in order to exit the engine compartment 26 through the outlet aperture 62. As such, there is more drag on the vehicle with the divider 40 being in the second position instead of the first position. Consequently, an operator would not necessarily want to permanently leave the divider 40 in the second position because of this additional drag created on the snowmobile 10. In particular, if the conditions for cooling are favorable (e.g., excessive snow or loosely-packed snow conditions), an operator may likely want to switch the divider 40 to the first position to decrease the drag on the snowmobile 10. Thus, an operator would most likely be selective about which position the divider 40 is set at, essentially balancing cooling functionality versus snowmobile performance.

There are many aspects of the heat exchanger system described above involving preferred embodiments. While the aspects may be preferred, it is contemplated that embodiments of the invention may also exist which incorporate variations to these aspects without departing from the spirit of the invention. For example, while the openings 32, 34 are described as being defined in both the hood 28 and nose pan 30 respectively, the openings 32, 34 could both instead be located in the nose pan 30 or in the hood 28. In addition, the openings 32, 34 are shown and described as generally being rectangular-shaped and square-shaped respectively. Also, the quantity of openings shown for each of the upper and lower openings 32, 34 is two. It should be appreciated that these openings 32, 34 could be defined to be any of a variety of different sizes as well as differing quantities than shown and described above.

Furthermore, while the system is described as being located in a front portion of the vehicle, and preferably within an engine compartment, neither is a requisite. It is contemplated that the system could instead be positioned anywhere on the vehicle, or contained within any of a variety of structures instead, so long as there is exposure to airflow. Also, while the heat exchanger 36 is described as being operatively coupled to the upper surface of the nose pan 30 and being operatively coupled to the divider 40 by the hinged portion 42 of the framework 38, it is contemplated that the heat exchanger 36 could just as well be coupled to the nose pan 30 and the divider 40 without the framework 38 being used for intermediary purposes. Additionally, while the heat exchanger 36 is described as being mounted low in the body assembly 26, it is appreciated that the heat exchanger 36 may be raised in position, yet still generally not increase the vehicle's center of mass. If the heat exchanger 36 were raised as such, a shield, functioning as a second divider, could be extended from the rear surface 60 of the heat exchanger 36 so that air flowing through the heat exchanger 36 could continue to still be directed out underneath the vehicle.

Finally, while the divider 40 of the heat exchanger system is described as a generally rectangular plate that is fabricated of plastic, it is contemplated that the divider 40 could be a variety of shapes and sizes as well as formed of a number of different materials without departing from the spirit of the invention. In addition, while the divider 40 is described as being in one of the first or second positions, it is contemplated that the divider 40 could have a multitude of positions providing a spectrum of settings at which the heat exchanger 36 could function. The divider 40 would then preferably be set by the operator based on riding conditions. Further, while the two positions demonstrate the air flowing through the second opening 34 in the hood 28 to be directed to one of the first or second cavities 43 and 51 respectively, it is contemplated that the front edge of the divider 40 could also be positioned in front of the second opening 34 to divide the air coming therethrough to both the first and second cavities 43 and 51 respectively as well. Likewise, the front end of the divider 40 could be positioned in front of the first opening 32 to divide the air coming therethrough to both the first and second cavities 43 and 51 respectively.

In using the heat exchanger system described above, there are many advantages. One such advantage is providing an effective heat exchanger for the vehicle. As such, the heat exchanger could complement the use of other heat exchangers on the vehicle. In snowmobiles, as described above, the heat exchanger 36 is preferably mounted low within the engine compartment 26 so as not to adversely raise the center of mass of the snowmobile 10. Consequently, the handling and maneuverability of the snowmobile 10 is not likely to be affected by the inclusion of the heat exchanger 36. Further, by preferably using a divider 40 in front of the heat exchanger 36, any steam created by precipitation (snow, water, etc.) coming in contact with the heat exchanger 36 is contained. With the airflow entering the first and second openings 32, 34 in the nose pan 30 and the hood 28 respectively, the steam is also not likely to flow back out either of those openings 32, 34. In turn, the steam is not likely to escape the body assembly 26 and cause any nuisance to the operator as mentioned above.

Another advantage is providing a heat exchanger which is dynamic in use. By preferably having the divider 40 rotatably coupled to the hinged portion 42 that extends from the heat exchanger 36, one can vary an effective volume of the first cavity 43, and in turn, vary the amount of air that enters the heat exchanger 36 by altering the position of the divider 40. As such, the cooling functionality of the heat exchanger 36 can be altered. In snowmobiles, as described above, the positioning of the divider 40 would be changed in response to riding conditions. For example, if the conditions are poor for cooling the engine via the heat exchangers located in the drive tunnel (e.g., little snow or tightly-packed snow conditions), the divider 40 may be adjusted to a position so as to increase the volume of the first cavity 43. In so doing, the amount of air flowing into the first cavity 43 to the heat exchanger 36 is increased, and in turn, the cooling functionality of the heat exchanger 36 is increased as well. This is demonstrated in FIG. 6, where the divider 40 is set in the second position, thereby directing air flowing through both the first and second openings 32, 34 to the heat exchanger 36. In contrast, if the conditions are favorable for cooling the engine via the extruded heat exchangers (e.g., excessive snow or loosely-packed snow conditions), the divider 40 can be adjusted to a position so as to decrease the volume of the first cavity 43. In so doing, the amount of air flowing into the first cavity 43 over time is decreased, thereby decreasing the cooling functionality of the heat exchanger 36, but also decreasing the amount of drag on the snowmobile 10. This is demonstrated in FIG. 5. Other advantageous aspects of the system include having the divider 40 being easily accessible to the operator. As such, once the hood 28 is opened, the divider 40 can be positioned relatively easily. In addition, the adjustability of the divider 40 provides access to the first cavity 43, enabling the operator to remove any debris that may have entered through the openings 32, 34 and become trapped within the cavity 43.

While embodiments of the present invention have been described, it should be understood that various changes, adaptations, and modifications may be made therein without departing from the spirit of the invention and the scope of the appended claims.

The invention claimed is:

1. A method of controlling the engine temperature of a snowmobile for use in multiple environments, the method including the steps of:
providing a snowmobile including a longitudinally extending chassis including a front portion and a rear portion; an endless track coupled to the chassis and positioned generally proximate the rear portion of the longitudinally extending chassis within a tunnel; a pair of steerable skis coupled to the chassis and positioned generally proximate the front portion of the longitudinally extending chassis; a straddle seat supported by the chassis and positioned generally proximate the rear portion of the longitudinally extending chassis and above the endless track; and a liquid cooled engine coupled to the endless track to power the endless track, the liquid cooled engine supported by the chassis and positioned in the forward portion of the snowmobile;
providing an extruded heat exchanger in a tunnel of the snowmobile;
providing a heat exchanger covered by a body member of the snowmobile, the heat exchanger being forward of at least a portion of the liquid cooled engine; and
controlling an amount of airflow to the heat exchanger based on a total size of the air inlets in fluid communication with the heat exchanger and the environment, the amount of airflow being less for a first environment wherein the snowmobile is being used in a loosely packed snow than a second environment wherein the snowmobile is being used in a tightly packed snow.

2. The method of claim 1, wherein the total size of the air inlets is increased for the second environment relative to the first environment.

3. The method of claim 1, wherein the step of controlling an amount of airflow to the heat exchanger includes the step of altering a number of air inlets in fluid communication with the heat exchanger and the environment.

4. The method of claim 3, wherein the step of altering a number of air inlets in fluid communication with the heat exchanger and the environment includes the steps of;
positioning a divider between a first air inlet and the heat exchanger, the divider being moveable between an open position wherein the first air inlet is in fluid communication with the heat exchanger and a closed position wherein the first air inlet is not in fluid communication with the heat exchanger;
moving the divider to the open position to increase the number of air inlets in fluid communication with the heat exchanger and the environment; and
moving the divider to the closed position to decrease the number of air inlets in fluid communication with the heat exchanger and the environment.

5. A snowmobile, including
a longitudinally extending chassis including a front portion and a rear portion;
an endless track coupled to the chassis and positioned generally proximate the rear portion of the longitudinally extending chassis;
a pair of steerable skis coupled to the chassis and positioned generally proximate the front portion of the longitudinally extending chassis;
a straddle seat supported by the chassis and positioned generally proximate the rear portion of the longitudinally extending chassis and above the endless track;
a liquid cooled engine coupled to the endless track to power the endless track, the liquid cooled engine supported by the chassis;
a heat exchanger positioned in front of at least a portion of the liquid cooled engine, the heat exchanger being in fluid communication with a liquid engine coolant of the engine and including a first generally forward facing side and a second generally rearward facing side;
a hood supported by the chassis; and
a nosepan supported by the chassis and covered by the hood, the nosepan including an air inlet and an air outlet, the air inlet being symmetrical about a centerline of the snowmobile and directing air towards the first generally forward facing side of the heat exchanger during forward movement of the snowmobile and the air outlet positioned to direct air from the second generally rearward facing side of the heat exchanger in a direction away from an operator located on the straddle seat.

6. The snowmobile of claim 5, wherein the steerable skis exit the nosepan through suspension wells, the suspension wells being the air outlet.

7. The snowmobile of claim 6, wherein the heat exchanger is forward of the liquid cooled engine.

8. The snowmobile of claim 5, further comprising an exhaust system including an exhaust headpipe, the heat exchanger being lower than the exhaust headpipe.

9. The snowmobile of claim 8, wherein the air outlet directs the air rearward around the endless track.

10. The snowmobile of claim 5, further including an extruded heat exchanger positioned proximate the endless track.

11. The snowmobile of claim 5, wherein the first generally forward facing side of the heat exchanger is positioned completely forward of the liquid cooled engine.

12. The snowmobile of claim 5, wherein the air passes from the first generally forward facing side of the heat exchanger through the heat exchanger to the second generally rearward facing side of the heat exchanger.

13. The snowmobile of claim 5, wherein the heat exchanger passes through the centerline of the snowmobile.

14. The snowmobile of claim 5, wherein the air inlet of the nosepan includes a plurality of spaced apart openings.

15. The snowmobile of claim 5, wherein the hood includes an air inlet directing air towards the first generally forward facing side of the heat exchanger during forward movement of the snowmobile.

16. The snowmobile of claim 15, wherein the air inlet of the hood includes a plurality of spaced apart openings.

17. The snowmobile of claim 15, wherein the air inlet of the hood is symmetrical about the centerline of the snowmonile.

18. The snowmobile of claim 5, further comprising a bumper supported by the chassis, the bumper positioned above and forward of the air inlet of the nosepan.

19. The snowmobile of claim 15, further comprising a bumper supported by the chassis, the bumper positioned below and forward of the air inlet of the hood.

20. The snowmobile of claim 5, wherein the endless track is disposed within a tunnel.

* * * * *